United States Patent
Maley et al.

(10) Patent No.: US 11,207,648 B2
(45) Date of Patent: Dec. 28, 2021

(54) SLOTTED PLATE SCALLOPS

(71) Applicant: UOP LLC, Des Plaines, IL (US)

(72) Inventors: John Christian Maley, Chicago, IL (US); Jeffrey R. Grott, Chicago, IL (US); Megan Kubacki, Park Ridge, IL (US); Nicholas W. Bridge, Oak Park, IL (US); Ka L. Lok, Buffalo Grove, IL (US); Kenneth D. Peters, Elmhurst, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/923,384

(22) Filed: Jul. 8, 2020

(65) Prior Publication Data

US 2021/0237015 A1 Aug. 5, 2021

Related U.S. Application Data (60) Provisional application No. 62/967,833, filed on Jan. 30, 2020.

(51) Int. Cl.
| | | |
|---|---|---|
| *B01J 8/00* | (2006.01) | |
| *B01J 8/02* | (2006.01) | |
| *B01J 19/00* | (2006.01) | |
| *B01J 19/24* | (2006.01) | |

(52) U.S. Cl.
CPC ........... *B01J 8/0214* (2013.01); *B01J 8/0085* (2013.01); *B01J 2208/0092* (2013.01); *B01J 2208/00884* (2013.01)

(58) Field of Classification Search
CPC ... B01J 8/00; B01J 8/008; B01J 8/0085; B01J 8/02; B01J 8/0207; B01J 8/0214; B01J 19/00; B01J 19/24; B01J 2208/00; B01J 2208/00796; B01J 2208/00884; B01J 2208/00893; B01J 2208/0092
See application file for complete search history.

(56) References Cited

U.S. PATENT DOCUMENTS

| | | |
|---|---|---|
| 3,167,399 A | 1/1965 | Hansen, Jr. |
| 4,374,094 A | 2/1983 | Farnham |
| 4,540,547 A | 9/1985 | Schuurman |

(Continued)

FOREIGN PATENT DOCUMENTS

| | | |
|---|---|---|
| EP | 0483975 A1 | 1/1991 |
| WO | 2017192299 A1 | 11/2017 |

OTHER PUBLICATIONS

International Search Report from corresponding PCT application No. PCT/US2021/015039 dated May 13, 2021.

(Continued)

*Primary Examiner* — Natasha E Young (57) ABSTRACT

An apparatus in a radial reactor is described. The apparatus comprises a vertically elongated conduit extending around a circumference of an outer wall of the radial reactor, a vertically oriented cylindrical center pipe in the radial reactor, and a catalyst bed. The conduit comprises an inner face and an outer face and a pair of opposing sides. The inner face has a plurality of slots. The pair of opposing sides have a plurality of slots. There is a riser at a top of the vertically elongated conduit. The catalyst bed is defined by the center pipe and the inner face.

20 Claims, 6 Drawing Sheets

(56) References Cited

U.S. PATENT DOCUMENTS

| | | | |
|---|---|---|---|
| 5,118,419 A * | 6/1992 | Evans | B01J 8/0214 |
| | | | 210/291 |
| 5,209,908 A | 5/1993 | Koves et al. | |
| 10,052,603 B2 | 8/2018 | Egolf et al. | |
| 10,384,181 B2 | 8/2019 | Grott et al. | |
| 2018/0050314 A1 * | 2/2018 | Grott | B01J 8/0278 |

OTHER PUBLICATIONS

Written Opinion from corresponding PCT application No. PCT/US2021/015039 completed Apr. 23, 2021.
Johnson Screens, Internals for Radial Flow Reactors, 2008, www.johnsonscreens.com.

* cited by examiner

SLOTTED PLATE SCALLOPS

RELATED APPLICATIONS

This application claims the benefit of U.S. Provisional Patent Application Ser. No. 62/967,833 filed on Jan. 30, 2020, the entirety of which is incorporated herein by reference.

BACKGROUND OF THE INVENTION

This invention relates to the field of fluid particle contact and to an apparatus for contacting fluids and particles. The invention further relates to fluid conduits which form the outer retaining wall for an annular particulate bed used in a radial flow system mounted in a cylindrical vessel. In such systems a fluid typically is directed radially inwardly or outwardly into or out of the particulate bed through openings in the inner surfaces of a plurality of outer, vertically arranged conduit members or through openings in a cylindrical screen basket member which has a smaller diameter than the inner wall of the vessel. The fluid passes through openings in a vertically arranged center pipe which forms the inner retaining wall for the annular particulate bed. The invention more particularly relates to fluid conduits having at least one tapered side relative to at least one reactor wall.

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, profile wire, or a punched plate. For a moving bed, the screen or mesh provides a barrier to prevent the loss of solid catalyst particles while allowing fluid to flow through the bed. Solid catalyst particles are added at the top, flow through the apparatus, and are removed at the bottom, while passing through a screened-in enclosure that permits the flow of fluid over the catalyst. The screen is preferably constructed of a non-reactive material.

The screens or meshes used to hold the catalyst particles within a bed are sized to have apertures sufficiently small that the particles cannot pass through. The vessel typically is a reactor which contains a bed of particulate material such as catalyst, absorbent, resins, or activated carbon. The fluid which passes through the particulate bed in a radial direction is usually a gas, but it could also be a liquid or a liquid/gas mixture. In prior art systems, the outer wall support for the annular particulate bed is often a ring of individual scallops members which have convex inner surfaces and outer surfaces which conform to the wall of the vessel. The scallops members can be formed from metal plates which contain perforations smaller in diameter than the size of the particulate material. They can also be formed with their convex inner surface comprising a screen element having a plurality of closely spaced wires welded to support rods. Such scallops are often sized so they can be installed or replaced when required by lifting them through an opening in the top of the vessel. Another type of prior art system includes a cylindrical screen basket member which is spaced inwardly from the outer wall of the vessel. Such a cylindrically shaped screen basket member cooperates with an inner screen pipe member to cause the particulate bed positioned between such inner and outer members to have a uniform thickness. However, the system is quite expensive since the large diameter screen cannot be installed or removed through a small upper opening in the vessel, as can the scallops type screen. In other embodiments, instead of individual scallops, the same function may be served by a screen that is mounted to cover the same area as the ring of individual scallops.

Examples of prior art systems which have scallops members around the inside surface of the outer vessel wall include Hansen, Jr. U.S. Pat. No. 3,167,399 and Koves et al U.S. Pat. No. 5,209,908. Farnham U.S. Pat. No. 4,374,094 shows vertical screen segments surrounding an annular catalyst bed which are spaced from the side wall of the vessel. Schuurman U.S. Pat. No. 4,540,547 shows a moving bed reactor wherein a ring of screen segments surrounds a centrally located catalyst bed and separates the catalyst from the outer annular chamber which receives the effluent after it passes through the screen surfaces. Nagaoka EP 0483975 shows a device for holding particulate catalyst in a radial flow reactor which comprises a ring of vertically arranged containers having abutting side walls and screened inner walls, the containers being filled with catalyst and positioned between an annular outer fluid chamber and an inner cylindrical fluid chamber.

Therefore, there is a need for improved scallops for radial flow reactors.

DETAILED DESCRIPTION

A problem exists with radial flow reactors where a catalyst flows down an annular region, and the annular region is defined by an inner screened partition and an outer screened partition, which defines the catalyst bed, or a particle retention volume for holding a granular solid. A fluid, usually a gas, flows across the partitions and catalyst bed, reacting with the catalyst to produce a product fluid, also usually a gas. The reactor holds the catalyst in with screens where the gas flows through. The dimension of these screens are typically established to minimize the pressure drop required to provide a uniform radial and axial gas distribution; however, this requires a significant volume within the reactor. The existing prior art scallops and outer baskets for these processes all have a constant cross sectional area along the length of the scallops/baskets.

U.S. Pat. No. 10,384,181 describes one solution. The apparatus is oriented for the downward, or in the direction of gravity, flow of a solid through the apparatus with the cross flow of a gas, and accordingly, the use of the terms downward and upward are in reference to directions relative to the direction of gravity.

The catalyst bed depth and volume are varied, providing advantages in the operation of a radial flow reactor. This is useful in the chemical industry for maximum utilization of reactor vessel volumes, and the overall catalyst content in the reactor can be increased by more than 20% using the design of the '181 patent. A further advantage of the design of the '181 patent is that catalyst may be more efficiently utilized. Since the catalyst is deactivating via coke buildup as it falls through the reacting space, having additional residence time in the lower regions of the reactor is favorable for process chemistries that involve deactivating catalysts. Hydraulic balancing is used to achieve a significant increase in bed depth within constraints on cross-flow inner screen pinning design and overall reactor pressure drop. The path length found on the bottom of the vessel can even be increased by more than 33% in one case.

Reforming scallops sizing (depth) is typically governed by the riser entrance component to achieve acceptable pressure drop for feed distribution and minimize overall system pressure drop. This results in a significant volume for the overall piece of equipment. The scallops and equivalent functioning reactor internal components are configured to have a varying cross sectional area along the length of the scallops/baskets (have a larger cross sectional area near the inlet/outlet nozzle and a smaller cross sectional area at the opposite end). In some instances, this configuration may be reversed.

In a radial flow reactor, the reactor comprises an inner surface and an outer surface with the catalyst disposed between the inner and outer surface forming a cylindrical structure. Depending on desired flow characteristics, the inner surface can be the inlet partition, with the outer surface as the outlet partition. In an alternative, the outer surface can be the inlet partition and the inner surface can be the outlet partition. Characteristics that would dictate the choice include, but are not limited to, the flow rate of the fluid, including whether the fluid expands or contracts due to increasing or decreasing the number of moles of chemicals within the fluid, as well as temperature changes in the fluid.

In the '181 patent's scallop design, contouring/tapering the back enclosure portion from the top to bottom of the scallop accommodates the riser for pressure drop minimization and distribution at the top and the downstream portion of the scallop to have a progressively reducing cross section corresponding to a volume reduction approaching nominally 50% of the original design size. Contouring/tapering the back enclosure portion also enables retaining the flat profile wire front face establishing a uniform catalyst bed depth and would make the new interchangeable design feasible for revamp service. 95+% of the feed enters the risers in the scallops and is contained in the enclosed scallop so the pocket behind the countered/tapered scallop is not affected and the reactor can remain cylindrical with no modification or design modification. The progressively reducing cross section from top to bottom is also advantageous to reduce velocity head conversion (approaches constant velocity or reduced deceleration) and enable reasonable distribution with decreased pressure drop incorporated into the system.

Prior art scallops have a constant cross sectional area along the length of the scallops. Discrete scallops of the '181 patent design may have advantages over a one-piece basket. Individual scallops can be installed in individual sections and can be repaired or replaced discretely (as opposed to replacing an entire basket). In addition, if one scallop loses catalyst containment due to damage, the entire basket does not lose containment. A modular (discrete sections) basket can be formed using a tapered front face made of profile wire.

In the '181 design, the end nearest the inlet nozzle would have the full cross sectional area required for hydraulics. The cross sectional area would be decreased along the length to a physical minimum at the other end. This decreases the volume in the scallops by a significant amount (30%-50%). The scallops/reactor overall length would also be slightly reduced because the average catalyst bed cross sectional area is increased. The weight of the scallops would be reduced making installation easier, and the cost may also be reduced.

The back enclosure plate may be contoured/tapered from the top to bottom of the scallop. The riser sizing for pressure drop minimization and distribution at the top of the scallop is decoupled form the downstream portion of the scallop. The downstream portion of the scallop can be optimized to have a progressively reducing cross section corresponding to a volume reduction approaching nominally 60% of the original design size. Contouring/tapering the back enclosure portion also enables retaining the flat profile wire front face establishing a uniform catalyst bed depth and would make the new interchangeable design feasible for revamp or retrofit service. 95+% of the feed enters the risers in the scallops and is contained in the enclosed scallop so the pocket behind the countered/tapered scallop is not affected and the reactor can remain cylindrical.

The tapered scallops of the '181 design are installed in a reactor in a similar fashion to existing scallops. Once installed, the tapered scallops form an effective continuous outer basket which contains the catalyst bed and also provides the inlet distribution volume for the vapor upstream of the catalyst bed (for inlet radial flow, reversed for outward radial flow).

The scallops of the '181 design provide uniformly distributed process flow to a catalyst bed in a radial flow reactor. The design features a profile wire/support rod construction in a single-length design with closure strips to block catalyst flow to the gap between adjacent scallops.

Another improved scallop design has been developed. The scallop comprises a vertically elongated conduit extending around the circumference of the outer wall of the radial reactor. The conduit comprises an inner face and an outer face and a pair of opposing sides.

The inner face (i.e., catalyst-facing side) of the conduit has openings in it. It may comprise screen, mesh, profile wire, or the like.

In some embodiments, the inner face (i.e., catalyst-facing side) of the conduit comprises a plate having a plurality of slots. The slots should be small enough to contain the catalyst pills. The size of the slots depends on the size of the catalyst pills being used in the particular process. The slots are typically no larger than about 1 mm in width. The slots may extend substantially across the inner face without interruption, or there may be columns of slots separated by solid portions of the plate. By the term "substantially across the inner face without interruption," we mean that the slot extends more than 70% of the distance across the inner face without interruption by a solid portion of the plate, or more than 75%, or more 80%, or more than 85%, or more than 90%, or more than 95%. The slots may be cut in the plate using any suitable process, include, but not limited to, laser cutting, water-jet cutting, or in some cases with thinner plate, punching the slots into the plate.

The sides of the conduit may also comprise a plate having a plurality of openings (although to a lesser degree than the inner face) to allow gas flow between adjacent conduits. The openings may be slots, holes, or the like. The sides may have openings covering about 5 to about 15% of the area covered by the slots in the inner face.

There is a riser at one end of the conduit. The riser could be at the top or the bottom depending on the process the conduit is used in.

The outer face comprises a plate which can be solid or have one or more openings. The openings may be slots, holes, or the like. Including opening(s) in the outer face provides a small amount of flow to prevent metal catalyzed coking (MCC coking) behind the conduit. MCC coking can occur when the process fluid react with internal metal in the reactor.

The slotted plate conduit design may optionally include one or more structural stiffeners, although stiffeners are not required. The stiffeners strengthen the design against both radial and axial bed pressures that are encountered in radial flow reactor processes. These stiffeners are installed so that they run along the vertical length of the inner face of the conduits perpendicular to the inner face. The stiffeners are connected (e.g., by welding) to the inner face or outer face (or both) of the conduit. The stiffeners are typically about 2-4 mm thick, and evenly spaced to support the inner face (catalyst-facing side) of the conduit. The stiffeners are cut to match the taper (if any) of the conduit. The stiffeners may have slots or holes to allow gas communication between the separated compartments of conduit.

This design of the structural stiffeners allows the incoming process fluid flow to develop more completely into a uniform flow before it enters the separate cells of the conduits. Other inventions of this type rely on perforations along the length of the support rods which not only adds cost to fabrication, but also decreases the structural integrity of the support rods.

In some embodiments, the stiffeners extend from the top of the catalyst bed. In other embodiments, the top of the stiffeners does not extend all the way to the top of the catalyst bed. The effect of fluid distribution among the separate cells of the conduit vs. top termination location of the structural stiffeners relative to the top of the catalyst bed was studied using computational fluid dynamics (CFD). The results indicated that fluid distribution was greatly improved by having the top termination point below the top of the catalyst bed, rather than having the top of the stiffener aligned with the top of the catalyst bed. The distance below the top of the catalyst bed is generally in the range of about one half to about twice the distance between the slotted inner face and the screen on the center pipe. This translates to a range of about 6 to about 30 in, for example.

The conduits are less expensive, and lighter weight than prior art constructions, while maintaining needed strength.

The conduits are substantially rectangular. The inner and outer faces are typically straight. In some embodiments, the inner face and/or the outer face may be curved to correspond to the curvature of the reactor wall (e.g., 360 degrees divided by the number of conduits or less).

The conduits can be tapered or non-tapered along the length of the conduit. In tapered conduits, the distance between the inner and outer faces at the top is different from the distance at a lower location. The top can be wider or narrower than the bottom, depending on the design. In non-tapered conduits, the distance between the inner and outer faces is constant along the length.

Non-tapered conduits are easier and less expensive to fabricate and to repair than tapered designs. In addition, the non-tapered design has more even vapor distribution inside the catalyst bed than a tapered design.

The slotted plate scallops may be made from any suitable material, including, but not limited to, stainless steel.

The slotted plate/stiffener configuration allows for scalable strength for revamp units. Some units require a reduced strength scallop because of a weaker center pipe due to older designs or age. The center pipe should be stronger than the conduit; otherwise failure could cause loss of catalyst containment. The conduits can be designed for varying levels of strength by adjusting the number and/or thickness of the stiffeners (or eliminating them altogether), reducing the thickness of the front face plate, or a combination of both. This is important for revamp retrofits in which the customer may be limited by other existing equipment to how strong the conduit can be.

Repair work to damaged slotted front face conduit is much easier than compared to support rod/profile wire construction. Profile wire is not a standard item, particularly in the high stainless streel grades required in many processes, and it is supplied by only a few companies. Moreover, profile wire is very difficult to weld to. In contrast, the slotted front face is very simple to weld, procure and install on a damaged conduit.

The slotted plate design provides a number of improvements over prior art conduits. First, there are no closure strips or seals between adjacent conduits. This allows catalyst to fill in the space between adjacent conduits, increasing the amount of catalyst in the reactor which may increase the yield. The catalyst between the conduits is active as a result of the sides of the conduit having slots allowing process gas to flow into the space between adjacent conduits. A portion of the vapor flow exits through the slots in the sides and flows through the catalyst located between the conduits. The catalyst volume can increase by up to 10% depending on the reactor geometry (e.g., up to 9%, or, up to 8%, or up to 7%, or up to 6%, or up to 5%, or up to 4%, or up to 3%, or up to 2%, or 2% to 10%, or 2% to 9%, or 2% to 8%, or 2% to 7%, or 2% to 6%, or 2% to 5%, or 2% to 4%, or 3% to 10%, or 4% to 10%, or 5% to 10%, or 6% to 10%, or 7% to 10%, or 8% to 10%), which is a significant increase.

In addition, not using closure strips or sealing mechanisms simplifies the installation and removal of the individual conduits, reducing installation time. The closure strips and/or sealing mechanisms require a lot of field fit up work and field welding and inspection. This is eliminated in the slotted inner face conduit design.

Conduits having the slotted inner face are low-pressure-drop. The slotted inner face allows for a significantly lower axial frictional pressure drop down the length of the conduit compared to previous conduits which utilized deep support rods to provide strength. The support rods add a significant amount of axial frictional pressure drop down the length of the conduit. This high axial frictional pressure drop causes increased vapor maldistribution inside the catalyst bed. Vapor maldistribution can result in lower yields. It also increases the chance of void blowing of the catalyst and fluidization of the catalyst, which can cause high pressure drop in the reactor thereby causing the unit to shut down. In contrast, the present design features a flat plate construction with no protrusions, which decreases the axial pressure drop and improves axial distribution of process gas. This will have a direct impact on the operating expenses of the radial flow reactor.

Another advantage of the low pressure drop front slotted plate design is that it allows for the conduit to be designed less deep (i.e., from the inner face to the outer face). This is due to the fact that the axial frictional pressure drop is based on the cross sectional area of the inside of the conduit and the pressure drop due to the roughness. Because the new conduits have very low roughness compared to conduits that utilize support rods, the cross sectional area can be made significantly smaller while achieving the same axial frictional pressure drop. This allows for further increase in catalyst volume. It also permits increased distance between the center pipe and the inner face of the conduit, resulting in increased personnel access inside the reactor for inspections and installation and repair work. Typical distances for inside the reactor are in the 10"-18" range; being able to increase the personnel access by even an inch or two makes a substantial difference in ease of access. Furthermore, it allows new reactors to be designed with a smaller reactor diameter, which reduces capital costs of the reactor by reducing the cost of the reactor, the weight of the reactor, the structure, the foundation, etc.

The conduits are designed so that they can be fabricated in shorter lengths. These segments can be fitted together and connected at the customer site before or during installation in the reactor. The conduits can be made in two or more segments (e.g., 2, 3, 4, 5, or more). The segments can be connected inside the reactor. This decreases installation time because the rest of the reactor internals do not have to be removed in order to install the conduits. In addition, the segmented construction allows the conduits to be shipped in standard size shipping containers.

By the term "about," we mean an amount within 10% of the value (above and below), or within 5%, or within 1%.

By the term "plurality," we mean more than one.

One aspect of the invention is an apparatus in a radial reactor. In one embodiment, the apparatus comprises: a vertically elongated conduit extending around a circumference of an outer wall of the radial reactor, the conduit comprising an inner face and an outer face and a pair of opposing sides, the inner face having a plurality of slots therein, the pair of opposing sides having a plurality of openings therein, and a riser at one end of the vertically elongated conduit; a vertically oriented cylindrical center pipe in the radial reactor; and a catalyst bed defined by the center pipe and the inner face.

In some embodiments, the apparatus further comprises: at least one stiffener extending from the inner face to the outer face.

In some embodiments, the at least one stiffener extends vertically less than a height of the vertically elongated conduit.

In some embodiments, the at least one stiffener extends vertically from a bottom of the vertically elongated conduit to a location below a top of the vertically elongated conduit, the location being a distance in a range of one half to twice a distance between the inner face and the center pipe.

In some embodiments, the plurality of slots extend substantially across the inner face without interruption.

In some embodiments, the plurality of slots are divided into at least two columns of slots separated by a solid portion of the inner face.

In some embodiments, the inner face has more slots than the pair of opposing sides.

In some embodiments, the outer face comprises a plate having one or more openings.

In some embodiments, the inner face is flat, or the outer face is flat, or both.

In some embodiments, the distance from the front face to the back face at the top of the vertically elongated conduit is different from the distance from the front face to the back face at a lower location on the vertically elongated conduit and wherein the distance from the center pipe to the inner face of the vertically elongated conduit at a top of the catalyst bed is different from the distance measured at a lower location of the catalyst bed.

In some embodiments, the distance from the front face to the back face at the top of the vertically elongated conduit is greater than the distance from the front face to the back face at the lower location on the vertically elongated conduit and wherein the distance from the center pipe to the inner face of the vertically elongated conduit at a top of the catalyst bed is less than the distance measured at a lower location of the catalyst bed.

In some embodiments, the apparatus further comprises a vapor outlet at an opposite end of the apparatus from the riser.

In some embodiments, the conduit comprises two or more segments, each segment having at least one connector to connect with a connector on another segment.

Another aspect of the invention is an apparatus in a radial reactor. In one embodiment, the apparatus comprises: a vertically elongated conduit extending around a circumference of an outer wall of the radial reactor, the conduit comprising an inner face and an outer face and a pair of opposing sides, the inner face having a plurality of slots therein, the pair of opposing sides having a plurality of slots therein, and a riser at one end of the vertically elongated conduit; a vertically oriented cylindrical center pipe in the radial reactor; a catalyst bed defined by the center pipe and the inner face.

In some embodiments, the apparatus further comprises: at least one stiffener extending from the inner face to the outer face.

In some embodiments, the at least one stiffener extends vertically less than a height of the vertically elongated conduit.

In some embodiments, the at least one stiffener extends vertically from a bottom of the vertically elongated conduit to a location below a top of the vertically elongated conduit, the location being a distance in a range of one half to twice a distance between the inner face and the center pipe.

In some embodiments, the plurality of slots extend substantially across the inner face without interruption.

In some embodiments, the plurality of slots are divided into at least two columns of slots separated by a solid portion of the inner face.

In some embodiments, the inner face has more slots than the pair of opposing sides.

In some embodiments, the outer face comprises a plate having one or more openings.

In some embodiments, the inner face is flat, or the outer face is flat, or both.

In some embodiments, the distance from the front face to the back face at the top of the vertically elongated conduit is different from the distance from the front face to the back face at a lower location on the vertically elongated conduit and wherein the distance from the center pipe to the inner face of the vertically elongated conduit at a top of the catalyst bed is different from a distance measured at a lower location of the catalyst bed.

In some embodiments, the distance from the front face to the back face at the top of the vertically elongated conduit is greater than the distance from the front face to the back face at the lower location on the vertically elongated conduit and wherein the distance from the center pipe to the inner face of the vertically elongated conduit at a top of the catalyst bed is less than the distance measured at a lower location of the catalyst bed.

In some embodiments, the apparatus further comprises a vapor outlet at an opposite end of the apparatus from the riser.

In some embodiments, the conduit comprises two or more segments, each segment having at least one connector to connect with a connector on another segment.

Another aspect of the invention is an apparatus. In one embodiment, the apparatus comprises: a vertically elongated conduit extending around a circumference of an outer wall of the radial reactor, the conduit comprising an inner face and an outer face and a pair of opposing sides, the inner face having a plurality of slots therein, the pair of opposing sides having a plurality of slots therein, and a riser at one end of the vertically elongated conduit.

In some embodiments, the apparatus further comprises: at least one stiffener extending from the inner face to the outer face.

In some embodiments, the at least one stiffener extends vertically less than a height of the vertically elongated conduit.

In some embodiments, the at least one stiffener extends vertically from a bottom of the vertically elongated conduit to a location below a top of the vertically elongated conduit, the location being a distance in a range of one half to twice a distance between the inner face and a center pipe in a reactor.

In some embodiments, the plurality of slots extend substantially across the inner face without interruption.

In some embodiments, the plurality of slots are divided into at least two columns of slots separated by a solid portion of the inner face.

In some embodiments, the inner face has more slots than the pair of opposing sides.

In some embodiments, the outer face comprises a plate having one or more openings.

In some embodiments, the inner face is flat, or the outer face is flat, or both.

In some embodiments, the distance from the front face to the back face at the top of the vertically elongated conduit is different from the distance from the front face to the back face at a lower location on the vertically elongated conduit.

In some embodiments, the distance from the front face to the back face at the top of the vertically elongated conduit is greater than the distance from the front face to the back face at the lower location on the vertically elongated conduit.

In some embodiments, the apparatus further comprises a vapor outlet at an opposite end of the apparatus from the riser.

In some embodiments, the conduit comprises two or more segments, each segment having at least one connector to connect with a connector on another segment.

Figure 1:
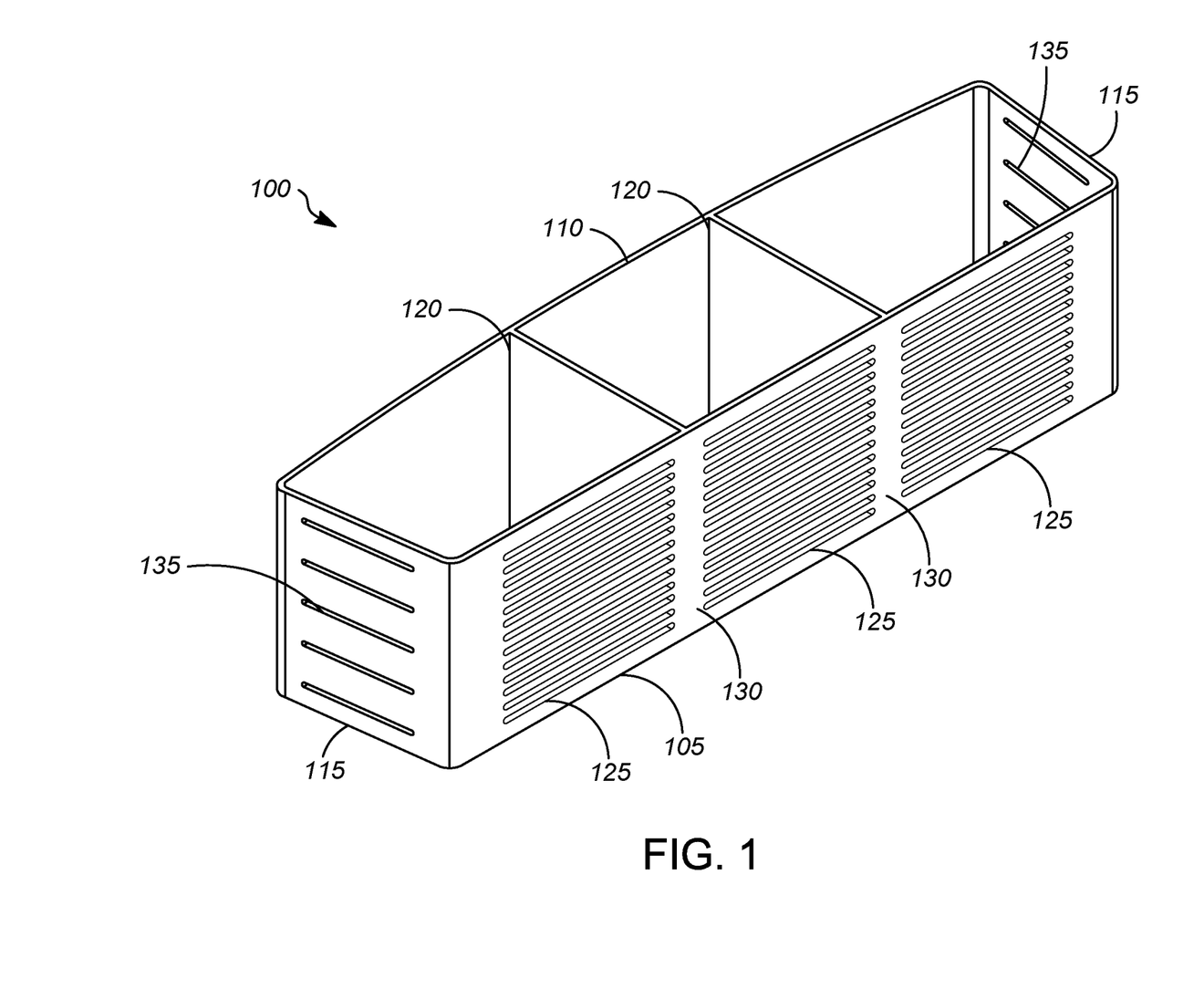
FIG. 1 shows an embodiment of a vertically elongated conduit of the present invention.
Figure 2:
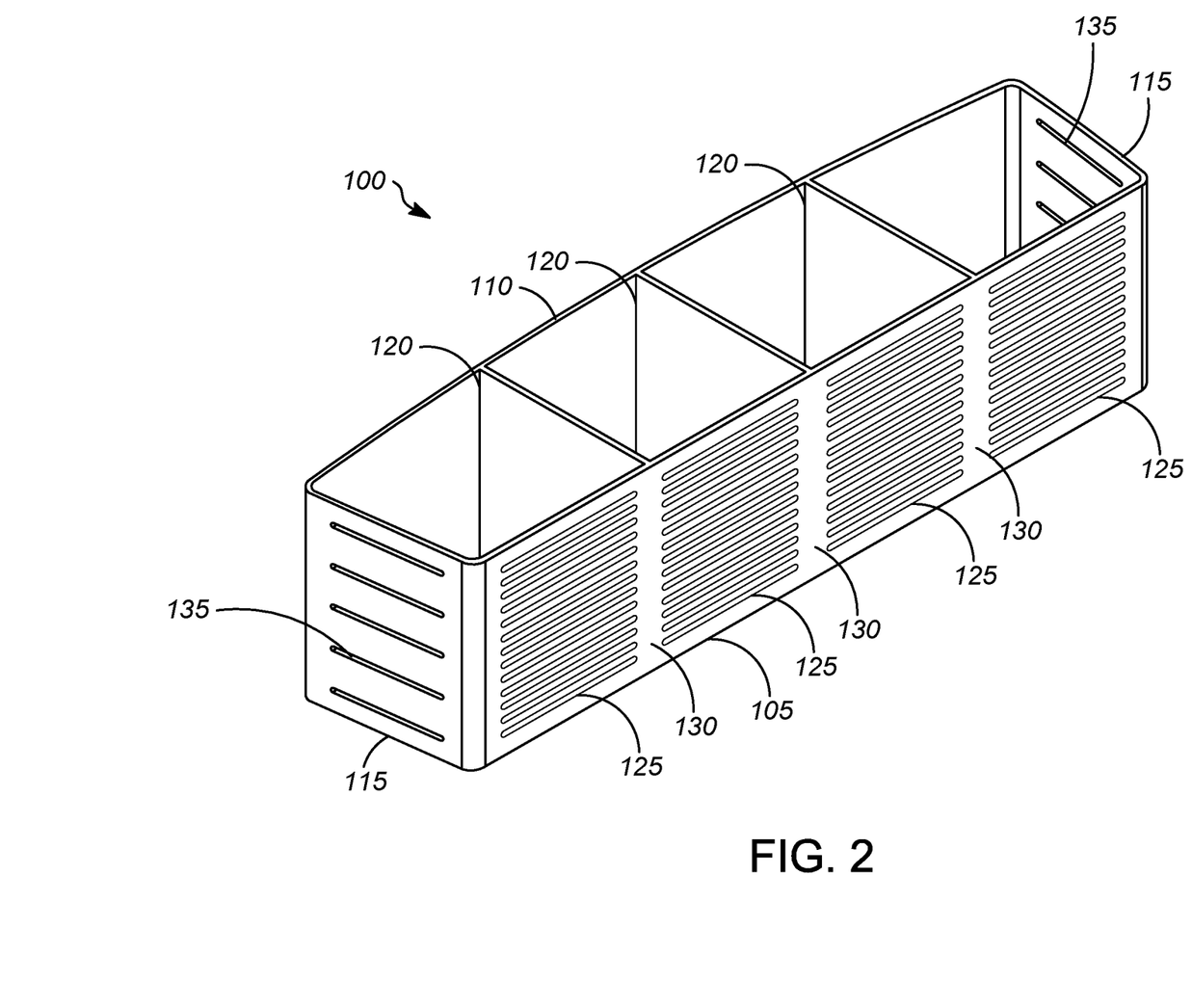
FIG. 2 shows another embodiment of a vertically elongated conduit of the present invention.
Figure 3:
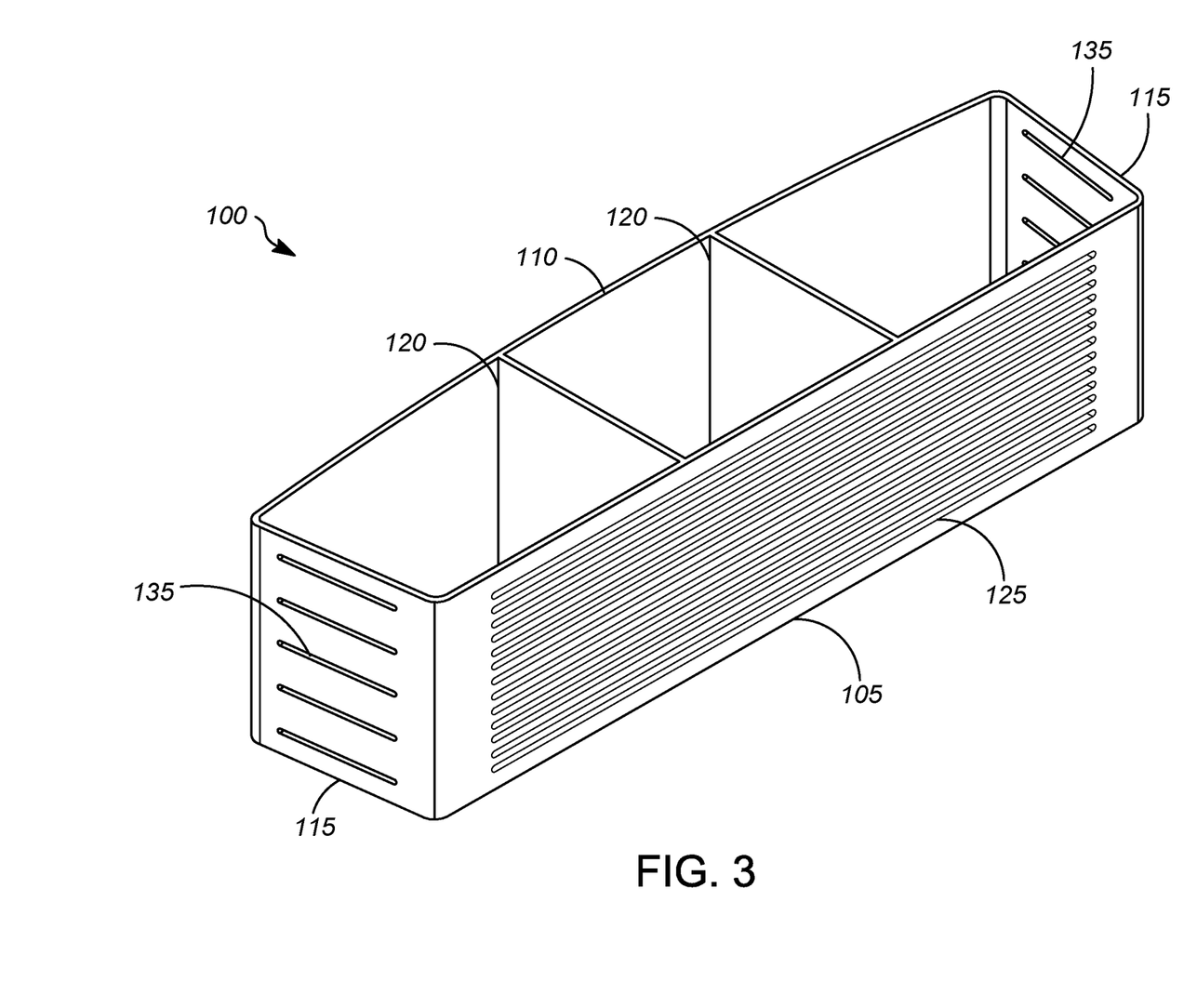
FIG. 3 shows another embodiment of a vertically elongated conduit of the present invention.

FIGS. 1-3 illustrate different embodiments of the conduits. In FIG. 1, the conduit 100 has an inner face 105, outer face 110, and a pair of opposing sides 115. The conduit 100 has two stiffeners 120 extending between the inner face 105 and the outer face 110. The inner face 105 includes a plurality of slots 125. As shown, the plurality of slots 125 are arranged in three columns separated by two solid portions of the inner face 105. There are a plurality of slots 135 in the sides 115.

FIG. 2 illustrates another embodiment of a conduit 100. In this embodiment, there are three stiffeners 120. The plurality of slots 125 are arranged in four columns separated by three solid portions 130 of the inner face 105.

In the embodiment of FIG. 3, the plurality of slots 125 extend across the inner face 105. No solid portions separate the plurality of slots 125.

Figure 4:
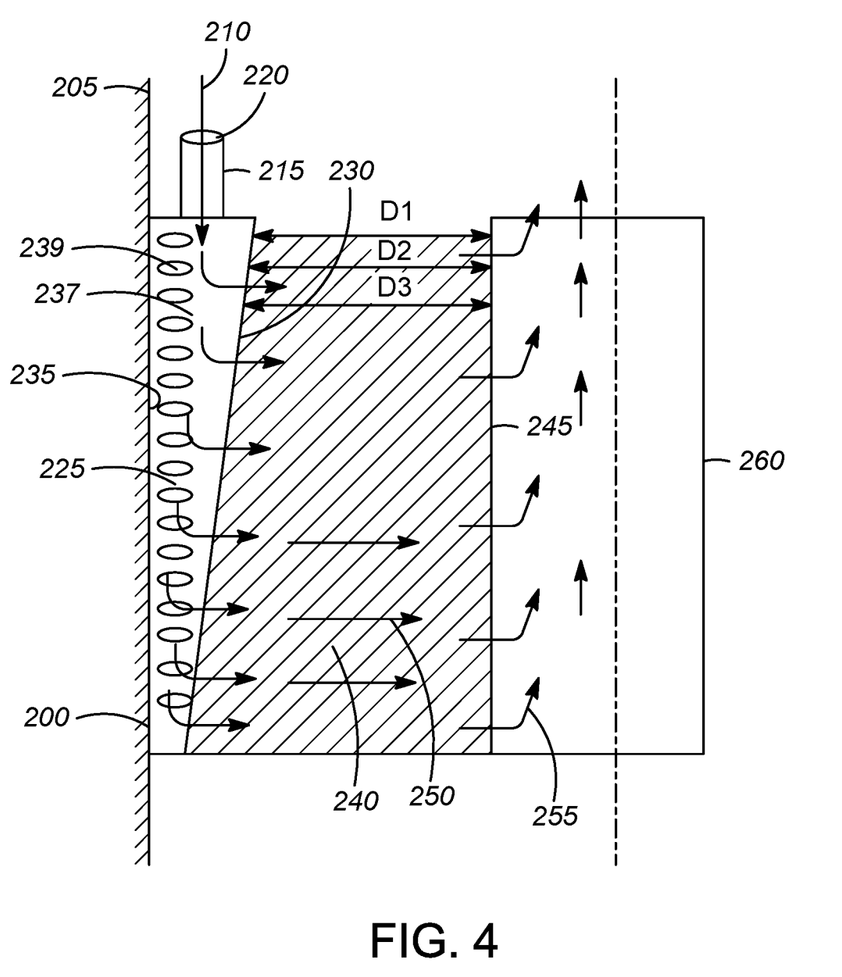
FIG. 4 shows an embodiment of the apparatus having a tapered front wall.

FIG. 4 illustrates how the catalyst bed depth changes from the top to the bottom and provides for an increased catalyst volume within the reactor when a tapered conduit is used. In a reactor 200, reactor shell 205 is shown. In an embodiment of the invention, vapor 210 is shown entering riser 215 through aperture 220. Conduit 225 has a slotted inner face 230, an outer face 235, and side 237 with slots 239. A catalyst bed 240 is shown between slotted inner face 230 and surface 245 which may be a screen material in some embodiments. Catalyst bed 240 has a varying sized diameter with D2 greater than or equal to D1 and D3 greater than or equal to D2 and D3 greater than or equal to a diameter taken at the top of catalyst bed 240. Also shown in FIG. 4 is radial flow vapor 250 shown circulating in an upward direction as vapor flow 255 into a centerpipe portion 260 of reactor 200.

Figure 5A:
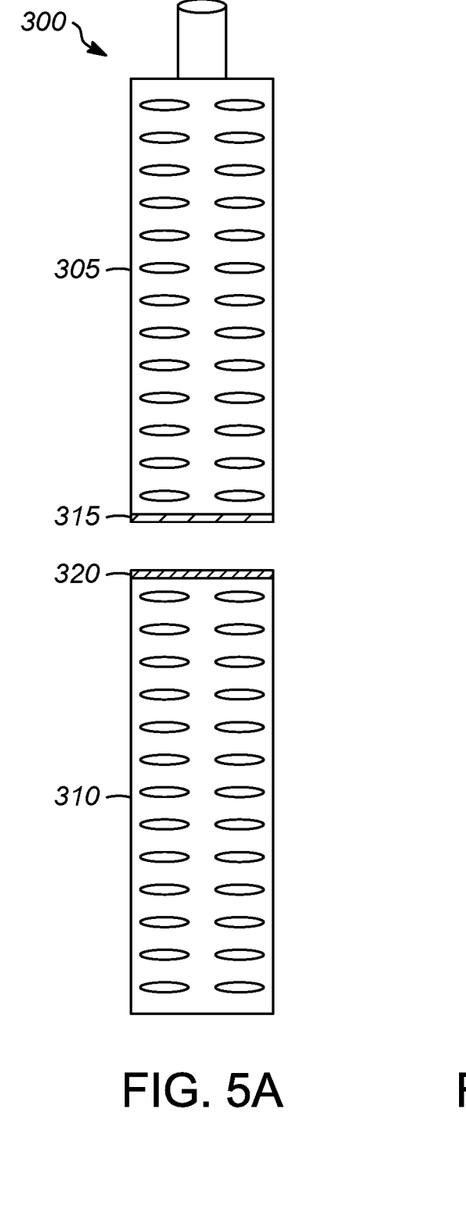
FIGS. 5A-5D illustrate various embodiments of segmented conduits.
Figure 5B:
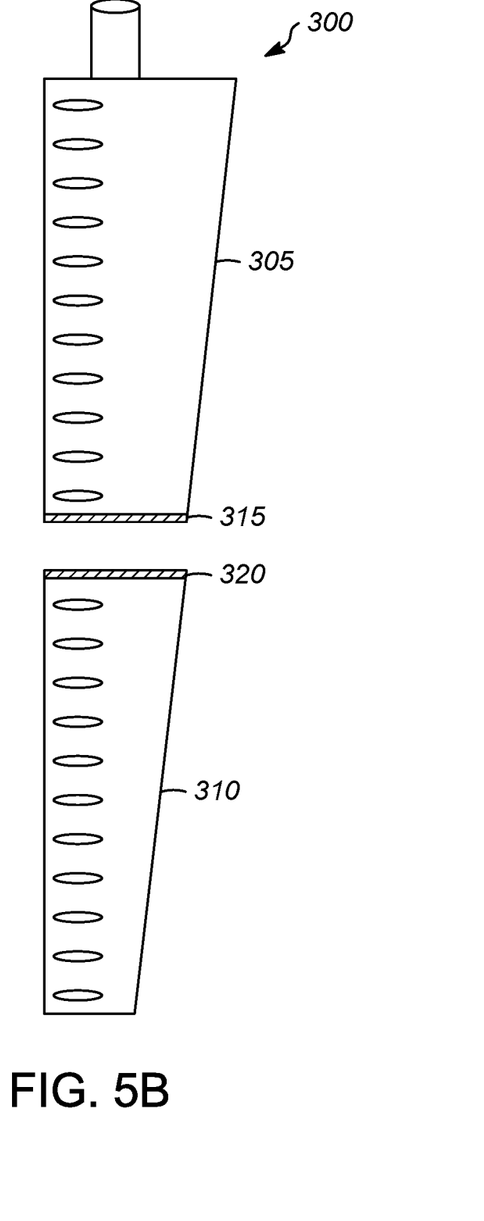
Figure 5C:
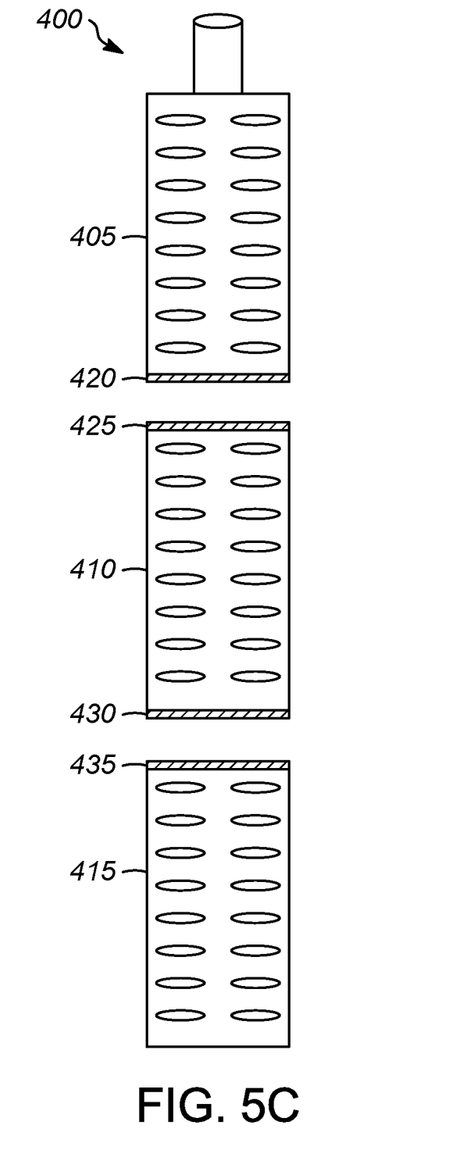
Figure 5D:
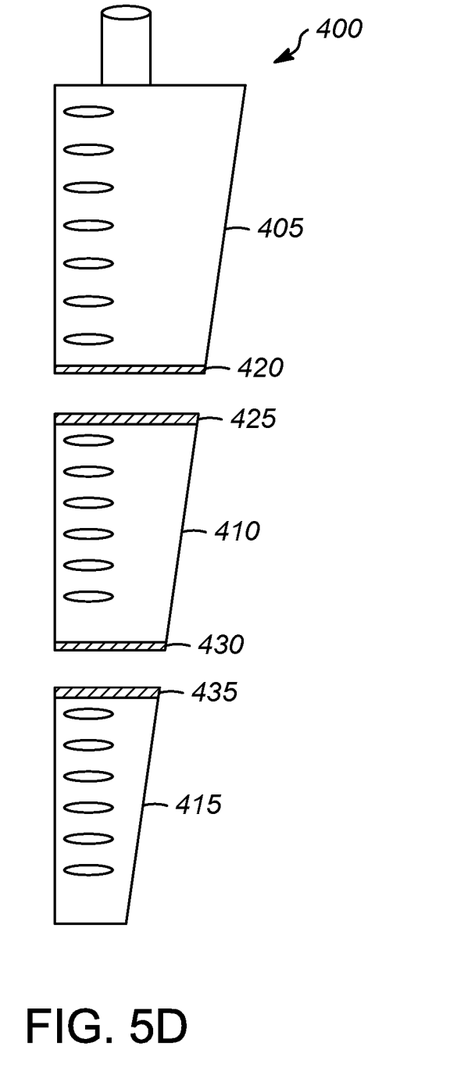

FIGS. 5A-5D illustrate various embodiments of the segmented construction. FIGS. 5A and 5B show front and side views of two segment conduits 300. The two segment conduits 300 include first segment 305 and second segment 310. The first segment 305 has a connector 315 to mate with a connector 320 on the second segment 310. FIGS. 5C and 5D illustrate front and side views of three segment conduits 400. The three segment conduits 400 include first segment 405, second segment 410, and third segment 415. The first segment 405 has a connector 420 to mate with connector 425 of the second segment 410. Second segment 410 has a connector 430 to mate with connector 435 of the third segment 415.

Specific Embodiments

While the following is described in conjunction with specific embodiments, it will be understood that this description is intended to illustrate and not limit the scope of the preceding description and the appended claims.

A first embodiment of the invention is an apparatus in a radial reactor comprising a vertically elongated conduit extending around a circumference of an outer wall of the radial reactor, the conduit comprising an inner face and an outer face and a pair of opposing sides, the inner face having a plurality of slots therein, the pair of opposing sides having a plurality of openings therein, and a riser at one end of the vertically elongated conduit; a vertically oriented cylindrical center pipe in the radial reactor; a catalyst bed defined by the center pipe and the inner face. An embodiment of the invention is one, any or all of prior embodiments in this paragraph up through the first embodiment in this paragraph further comprising at least one stiffener extending from the inner face to the outer face. An embodiment of the invention is one, any or all of prior embodiments in this paragraph up through the first embodiment in this paragraph wherein the at least one stiffener extends vertically less than a height of the vertically elongated conduit. An embodiment of the invention is one, any or all of prior embodiments in this paragraph up through the first embodiment in this paragraph wherein the at least one stiffener extends vertically from a bottom of the vertically elongated conduit to a location below a top of the vertically elongated conduit, the location being a distance in a range of one half to twice a distance between the inner face and the center pipe. An embodiment of the invention is one, any or all of prior embodiments in this paragraph up through the first embodiment in this paragraph wherein the plurality of slots extend substantially across the inner face without interruption. An embodiment of the invention is one, any or all of prior embodiments in this paragraph up through the first embodiment in this paragraph wherein the plurality of slots are divided into at least two columns of slots separated by a solid portion of the inner face. An embodiment of the invention is one, any or all of prior embodiments in this paragraph up through the first embodiment in this paragraph wherein the inner face has more slots than the pair of opposing sides. An embodiment of the invention is one, any or all of prior embodiments in this paragraph up through the first embodiment in this paragraph wherein the outer face comprises a plate having one or more openings. An embodiment of the invention is one, any or all of prior embodiments in this paragraph up through the first embodiment in this paragraph wherein the inner face is flat, or the outer face is flat, or both. An embodiment of the invention is one, any or all of prior embodiments in this paragraph up through the first embodiment in this paragraph wherein a distance from the front face to the back face at the top of the vertically elongated conduit is different from a distance from the front face to the back face at a lower location on the vertically elongated conduit and wherein a distance from the center pipe to the inner face of the vertically elongated conduit at a top of the catalyst bed is different from a distance measured at a lower location of the catalyst bed. An embodiment of the invention is one, any or all of prior embodiments in this paragraph up through the first embodiment in this paragraph wherein the distance from the front face to the back face at the top of the vertically elongated conduit is greater than the distance from the front face to the back face at the lower location on the vertically elongated conduit and wherein the distance from the center pipe to the inner face of the vertically elongated conduit at a top of the catalyst bed is less than the distance measured at a lower location of the catalyst bed. An embodiment of the invention is one, any or all of prior embodiments in this paragraph up through the first embodiment in this paragraph further comprising a vapor outlet at an opposite end of the apparatus from the riser. An embodiment of the invention is one, any or all of prior embodiments in this paragraph up through the first embodiment in this paragraph wherein the conduit comprises two or more segments, each segment having at least one connector to connect with a connector on another segment.

A second embodiment of the invention is an apparatus in a radial reactor comprising a vertically elongated conduit extending around a circumference of an outer wall of the radial reactor, the conduit comprising an inner face and an outer face and a pair of opposing sides, the inner face having a plurality of slots therein, the pair of opposing sides having a plurality of slots therein, and a riser at one end of the vertically elongated conduit; a vertically oriented cylindrical center pipe in the radial reactor; a catalyst bed defined by the center pipe and the inner face. An embodiment of the invention is one, any or all of prior embodiments in this paragraph up through the second embodiment in this paragraph further comprising at least one stiffener extending from the inner face to the outer face. An embodiment of the invention is one, any or all of prior embodiments in this paragraph up through the second embodiment in this paragraph wherein the at least one stiffener extends vertically less than a height of the vertically elongated conduit. An embodiment of the invention is one, any or all of prior embodiments in this paragraph up through the second embodiment in this paragraph wherein the outer face comprises a plate having one or more openings. An embodiment of the invention is one, any or all of prior embodiments in this paragraph up through the second embodiment in this paragraph wherein a distance from the front face to the back face at the top of the vertically elongated conduit is different from a distance from the front face to the back face at a lower location on the vertically elongated conduit and wherein a distance from the center pipe to the inner face of the vertically elongated conduit at a top of the catalyst bed is different from a distance measured at a lower location of the catalyst bed. An embodiment of the invention is one, any or all of prior embodiments in this paragraph up through the second embodiment in this paragraph further comprising a vapor outlet at an opposite end of the apparatus from the riser. An embodiment of the invention is one, any or all of prior embodiments in this paragraph up through the second embodiment in this paragraph wherein the conduit comprises two or more segments, each segment having at least one connector to connect with a connector on another segment.

A third embodiment of the invention is an apparatus in a radial reactor comprising a vertically elongated conduit extending around a circumference of an outer wall of the radial reactor, the conduit comprising an inner face and an outer face and a pair of opposing sides, the inner face having a plurality of slots therein, the pair of opposing sides having a plurality of slots therein, and a riser at one end of the vertically elongated conduit. An embodiment of the invention is one, any or all of prior embodiments in this paragraph up through the third embodiment in this paragraph further comprising at least one stiffener extending from the inner face to the outer face. An embodiment of the invention is one, any or all of prior embodiments in this paragraph up through the third embodiment in this paragraph wherein the at least one stiffener extends vertically less than a height of the vertically elongated conduit. An embodiment of the invention is one, any or all of prior embodiments in this paragraph up through the third embodiment in this paragraph wherein the outer face comprises a plate having one or more openings. An embodiment of the invention is one, any or all of prior embodiments in this paragraph up through the third embodiment in this paragraph wherein a distance from the front face to the back face at the top of the vertically elongated conduit is different from a distance from the front face to the back face at a lower location on the vertically elongated conduit. An embodiment of the invention is one, any or all of prior embodiments in this paragraph up through the third embodiment in this paragraph further comprising a vapor outlet at an opposite end of the apparatus from the riser. An embodiment of the invention is one, any or all of prior embodiments in this paragraph up through the third embodiment in this paragraph wherein the conduit comprises two or more segments, each segment having at least one connector to connect with a connector on another segment.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An apparatus in a radial reactor comprising:
   a vertically elongated conduit extending around a portion of a circumference of an outer wall of the radial reactor, the conduit comprising an inner face and an outer face and a pair of opposing sides, the inner face having a plurality of slots therein, the pair of opposing sides having a plurality of openings therein, and a riser at one end of the vertically elongated conduit;
   a vertically oriented cylindrical center pipe in the radial reactor; and
   a catalyst bed defined by the center pipe and the inner face.

2. The apparatus of claim 1, further comprising:
   at least one stiffener extending from the inner face to the outer face.

3. The apparatus of claim 2, wherein the at least one stiffener extends vertically less than a height of the vertically elongated conduit.

4. The apparatus of claim 2, wherein the at least one stiffener extends vertically from a bottom of the vertically elongated conduit to a location below a top of the vertically elongated conduit, the location being a distance in a range of one half to twice a distance between the inner face and the center pipe.

5. The apparatus of claim 1, wherein the plurality of slots extend substantially across the inner face without interruption.

6. The apparatus of claim 1, wherein the plurality of slots are divided into at least two columns of slots separated by a solid portion of the inner face.

7. The apparatus of claim 1, wherein the inner face has more slots than the pair of opposing sides has openings.

8. The apparatus of claim 1, wherein the outer face comprises a plate having one or more openings.

9. The apparatus of claim 1, wherein the inner face is flat, or the outer face is flat, or both.

10. The apparatus of claim 1, wherein a distance from the front face to the back face at the top of the vertically elongated conduit is different from a distance from the front face to the back face at a lower location on the vertically elongated conduit and wherein a distance from the center pipe to the inner face of the vertically elongated conduit at a top of the catalyst bed is different from a distance measured at a lower location of the catalyst bed.

11. The apparatus of claim 10, wherein the distance from the front face to the back face at the top of the vertically elongated conduit is greater than the distance from the front face to the back face at the lower location on the vertically elongated conduit and wherein the distance from the center pipe to the inner face of the vertically elongated conduit at a top of the catalyst bed is less than the distance measured at a lower location of the catalyst bed.

12. The apparatus of claim 1, further comprising a vapor outlet at an opposite end of the apparatus from the riser.

13. The apparatus of claim 1, wherein the conduit comprises two or more segments, each segment having at least one connector to connect with a connector on another segment.

14. An apparatus in a radial reactor comprising:
   a vertically elongated conduit extending around a portion of a circumference of an outer wall of the radial reactor, the conduit comprising an inner face and an outer face and a pair of opposing sides, the inner face having a plurality of slots therein, the pair of opposing sides having a plurality of slots therein, and a riser at one end of the vertically elongated conduit;
   a vertically oriented cylindrical center pipe in the radial reactor; and
   a catalyst bed defined by the center pipe and the inner face.

15. The apparatus of claim 14, further comprising:
   at least one stiffener extending from the inner face to the outer face.

16. The apparatus of claim 15, wherein the at least one stiffener extends vertically less than a height of the vertically elongated conduit.

17. The apparatus of claim 14, wherein the outer face comprises a plate having one or more openings.

18. The apparatus of claim 14, wherein a distance from the front face to the back face at the top of the vertically elongated conduit is different from a distance from the front face to the back face at a lower location on the vertically elongated conduit and wherein a distance from the center pipe to the inner face of the vertically elongated conduit at a top of the catalyst bed is different from a distance measured at a lower location of the catalyst bed.

19. The apparatus of claim 14, wherein the conduit comprises two or more segments, each segment having at least one connector to connect with a connector on another segment.

20. An apparatus comprising:
   a vertically elongated conduit extending around a portion of a circumference of an outer wall of a radial reactor, the conduit comprising an inner face and an outer face and a pair of opposing sides, the inner face having a plurality of slots therein, the pair of opposing sides having a plurality of slots therein, and a riser at one end of the vertically elongated conduit.

* * * * *